United States Patent
Lim

(10) Patent No.: US 10,379,192 B2
(45) Date of Patent: Aug. 13, 2019

(54) SCHEME CAPABLE OF CALIBRATING VALUE OF SAMPLING PRECISION OF OPTICAL SENSOR FOR TRACKING

(71) Applicant: PixArt Imaging (Penang) SDN. BHD., Penang (MY)

(72) Inventor: Chiang Hee Lim, Penang (MY)

(73) Assignee: PixArt Imaging (Penang) SDN. BHD., Penang (MY)

( * ) Notice: Subject to any disclaimer, the term of this patent is extended or adjusted under 35 U.S.C. 154(b) by 202 days.

(21) Appl. No.: 15/213,411

(22) Filed: Jul. 19, 2016

(65) Prior Publication Data
US 2018/0024221 A1    Jan. 25, 2018

(51) Int. Cl.
*G01S 3/78* (2006.01)
*B41J 29/38* (2006.01)
*G01S 3/786* (2006.01)

(52) U.S. Cl.
CPC .............. *G01S 3/7803* (2013.01); *B41J 29/38* (2013.01); *G01S 3/786* (2013.01)

(58) Field of Classification Search
CPC .......... G01S 3/7803; G01S 3/786; B41J 29/38
See application file for complete search history.

(56) References Cited

U.S. PATENT DOCUMENTS

| | | | |
|---|---|---|---|
| 2004/0218960 A1* | 11/2004 | Lin ...................... | G03G 15/326 400/118.2 |
| 2007/0032974 A1* | 2/2007 | Muniraju ............. | G01D 18/008 702/85 |
| 2009/0100903 A1* | 4/2009 | Porjo ..................... | G12B 13/00 73/1.88 |
| 2009/0140984 A1* | 6/2009 | Soo ....................... | G06F 3/0317 345/166 |

* cited by examiner

*Primary Examiner* — Manuel L Barbee
(74) *Attorney, Agent, or Firm* — Winston Hsu

(57) ABSTRACT

A method for calibrating a value of sampling precision of an optical sensor for tracking includes: reading a precision variance and a setting precision value from a memory device; measuring the sampling precision of the optical sensor under a normal mode to generate an actually measured precision value; calculating a normalized value that is proportional to the actually measured precision value according to the precision variance, the actually measured precision value, and the setting precision value; and, calibrating the actually measured precision value by using the normalized value.

17 Claims, 3 Drawing Sheets

US 10,379,192 B2

SCHEME CAPABLE OF CALIBRATING VALUE OF SAMPLING PRECISION OF OPTICAL SENSOR FOR TRACKING

BACKGROUND OF THE INVENTION

1. Field of the Invention

The invention relates to an optical sensing scheme, and more particularly, to a method, optical sensor, and remote host device capable of calibrating a value of sampling precision (resolution value) of the optical sensor for tracking.

2. Description of the Prior Art

Generally speaking, a conventional scheme may employ an optical sensor to track and sense motion a movable electronic device such as a mouse device. The optical sensor is arranged to track and sense the motion based on reflected light from a reflecting surface. Unfortunately, it is impossible to guarantee the fixed distance from a sensor system to a corresponding reflecting surface and no variance in the lens magnification for each case, and a slight variance in the lens magnification and the distance will cause a significant difference for the result of the motion tracked and sensed by this optical sensor. This causes that the value of sampling precision (i.e. resolution) reported from the optical sensor may be different even though the motion for each case is identical.

SUMMARY OF THE INVENTION

Therefore one of the objectives of the invention is to provide a scheme for calibrating a value of sampling precision of an optical sensor for tracking, to solve the above-mentioned problem.

According to embodiments of the invention, a method for calibrating a value of sampling precision of an optical sensor for tracking is disclosed. The method comprises: reading a precision variance and a setting precision value from a memory device; measuring the sampling precision of the optical sensor under a normal mode to generate an actually measured precision value; calculating a normalized value that is proportional to the actually measured precision value according to the precision variance, the actually measured precision value, and the setting precision value; and, calibrating the actually measured precision value by using the normalized value.

According to the embodiments, an optical sensor capable of calibrating a value of sampling precision of the optical sensor is disclosed. The optical sensor comprises a memory device, a detecting circuit, and a controller. The memory device is arranged for storing a precision variance and a setting precision value. The detecting circuit is arranged for measuring the sampling precision of the optical sensor under a normal mode to generate an actually measured precision value. The controller is coupled to the memory device and the detecting circuit, and is arranged for calculating a normalized value that is proportional to the actually measured precision value according to the precision variance, the actually measured precision value, and the setting precision value, and for calibrating the actually measured precision value by using the normalized value.

According to the embodiments, a host device remotely connected to an optical sensor and capable of calibrating a value of sampling precision of the optical sensor is disclosed. The host device comprises a memory device and a controller. The memory device is arranged for storing a precision variance and a setting precision value. The controller is coupled to the memory device and arranged for controlling the optical sensor to measure the sampling precision of the optical sensor under a normal mode to generate an actually measured precision value, for calculating a normalized value that is proportional to the actually measured precision value according to the precision variance, the actually measured precision value, and the setting precision value, and for calibrating the actually measured precision value by using the normalized value.

According to the embodiments, one of the benefits provided by the invention is that a resolution value (a value of sampling precision) from or reported by an optical sensor can be calibrated to be close to or at the exact setting resolution value. The calibration procedure can be partially or complemented performed at the optical sensor and/or at the remote host device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
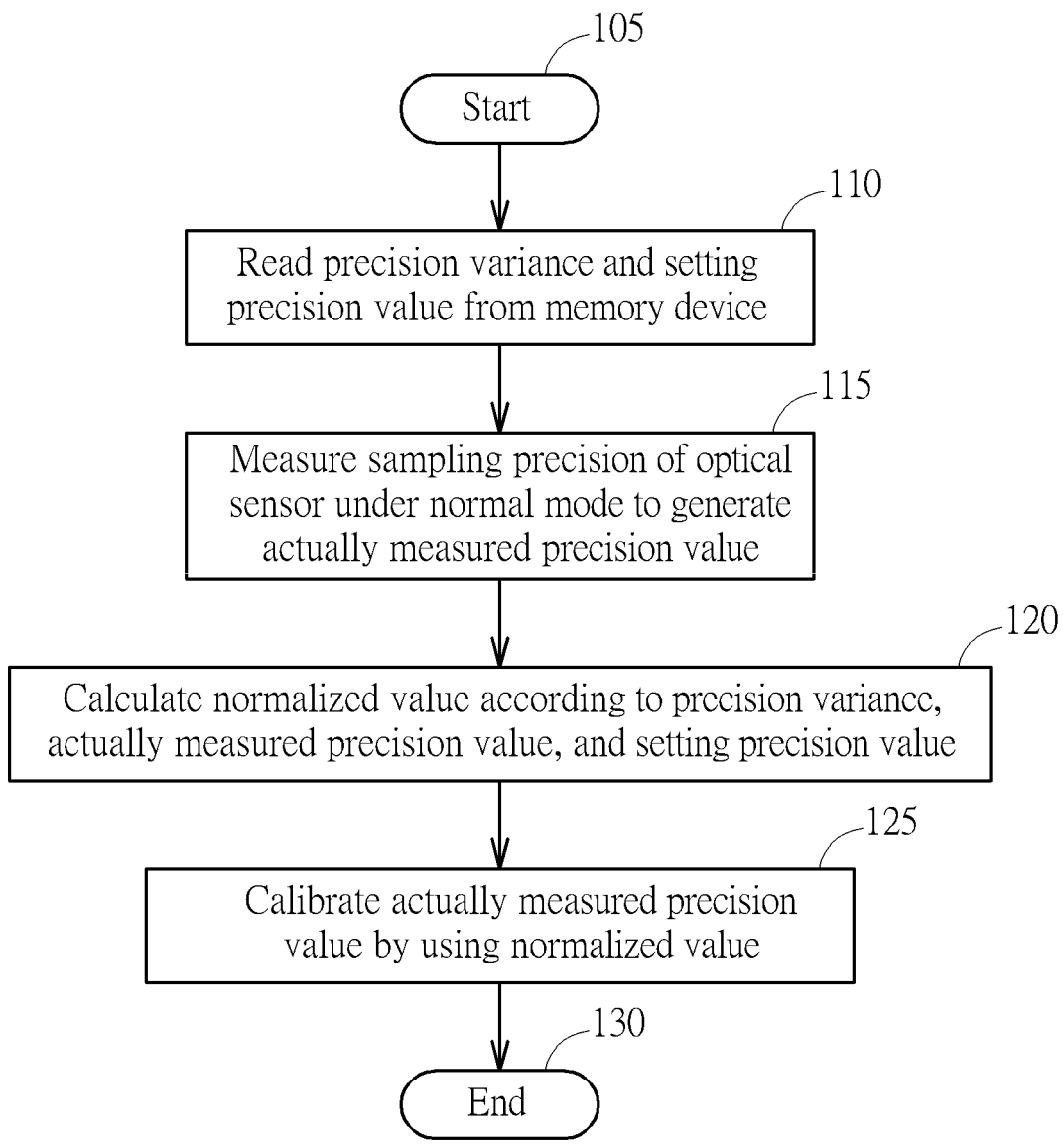
FIG. 1 is a flowchart of a method for calibrating a value of sampling precision of an optical sensor for tracking according to embodiments of the invention.

Please refer to FIG. 1. FIG. 1 is a flowchart of a method for calibrating a value of sampling precision (i.e. resolution value) of an optical sensor for tracking according to embodiments of the invention. The optical sensor can be used for tracking motion of a mouse device, a printer head, or a movable electronic device. The optical sensor is arranged to track and sense motion of the mouse device, printer head, or movable electronic device based on reflected light from a surface. A tracking and sensing result of the motion is generated, reported, and represented by a value of the sampling precision (i.e. resolution value) which may be represented by using counts per inch (CPI) or dots per inch (DPI). Actually, it is impossible to guarantee the fixed distance from an optical sensor to a corresponding reflecting surface and no variance in the lens magnification for each case, and a slight variance in the lens magnification and the distance may cause a significant difference for the result of the motion tracked and sensed by this optical sensor. This causes that the value of sampling precision reported from the optical sensor may be different even though the motion for each case is identical. To solve this problem, the method is provided to calibrate or fix the value of sampling precision of the optical sensor to calibrate, adjust or keep the value of sampling precision at a setting precision value or within a tolerable range of the setting precision value. The method, the following steps, and/or at least one step can be performed by the optical sensor installed within the mouse device, printer head, or movable electronic device, and can be also performed by a host device remotely and electrically connected to the mouse device, printer head, or movable electronic device. Steps of FIG. 1 are detailed in the following:

Step 105: Start;

Step 110: Read a precision variance and a setting precision value from a memory device;

Step 115: Measure the sampling precision of the optical sensor under a normal mode to generate an actually measured precision value;

Step 120: Calculate a normalized value that is proportional to the actually measured precision value according to the precision variance, the actually measured precision value, and the setting precision value;

Step 125: Calibrate the actually measured precision value by using the normalized value;

Step 130: End.

For example, the setting precision value is configured as 1000 CPI/DPI, and this value can be obtained from the optical sensor and/or from a host device remotely connected to the optical sensor. The optical sensor is arranged to enter a test mode, and under the test mode it is arranged to measure the sampling precision of the optical sensor to generate a test precision value; the measurement operation can be triggered and performed by the host device or the optical sensor itself. In this case, an actually reported sampling precision (resolution) of the optical sensor for example is at 1088 CPI/DPI (i.e. the test precision value), and the host device or optical sensor is arranged for calculating a difference between the setting precision value (e.g. 1000 CPI/DPI) and the test precision value (1088 CPI/DPI), to obtain the precision variance. The precision variance is calculated and determined as 88 CPI/DPI, and the setting precision value and precision variance can be stored in the memory device such as a programmable memory or a register circuit. For instance, the precision variance, 88, can be stored in the register circuit as the hexadecimal value '58'.

In Step 110, the setting precision value (e.g. 1000 CPI/DPI) and precision variance (e.g. 88 CPI/DPI) are read from the memory device mentioned above. The optical sensor enters a normal mode. In Step 115, under the normal mode the sampling precision of the optical sensor is measured to generate the actually measured precision value such as 1091 CPI/DPI. In Step 120, the host device or optical sensor is arranged to calculate the normalized value that is proportional to the actually measured precision value (e.g. 1091 CPI/DPI) according to the precision variance (88 CPI/DPI), the actually measured precision value (1091 CPI/DPI), and the setting precision value (1000 CPI/DPI). This can be represented by the following equation:

$$NR = AR \times \frac{1}{SR + V} \times SR$$

wherein NR represents the normalized value of the sampling precision (resolution) of the optical sensor, AR represents the actually reported precision value, SR represents the setting precision value, and V represents the precision variance. For example, based on the above-mentioned values, the normalized value of the resolution is calculated and determined as 1003 CPI/DPI. The actually reported precision value AR can be calibrated and adjusted by using the normalized value NR accordingly.

In another example, the precision variance V may include a negative sign. For example, if the precision variance V is calculated and determined as −63 CPI/DPI under the test mode and the actually reported precision value AR under the normal mode is equal to 1011 CPI/DPI, then the normalized value NR of resolution is calculated based on the above equation and determined as 1079 CPI/DPI. The actually measured precision value AR is calibrated or adjusted by using the normalized value NR mentioned above.

Figure 2:
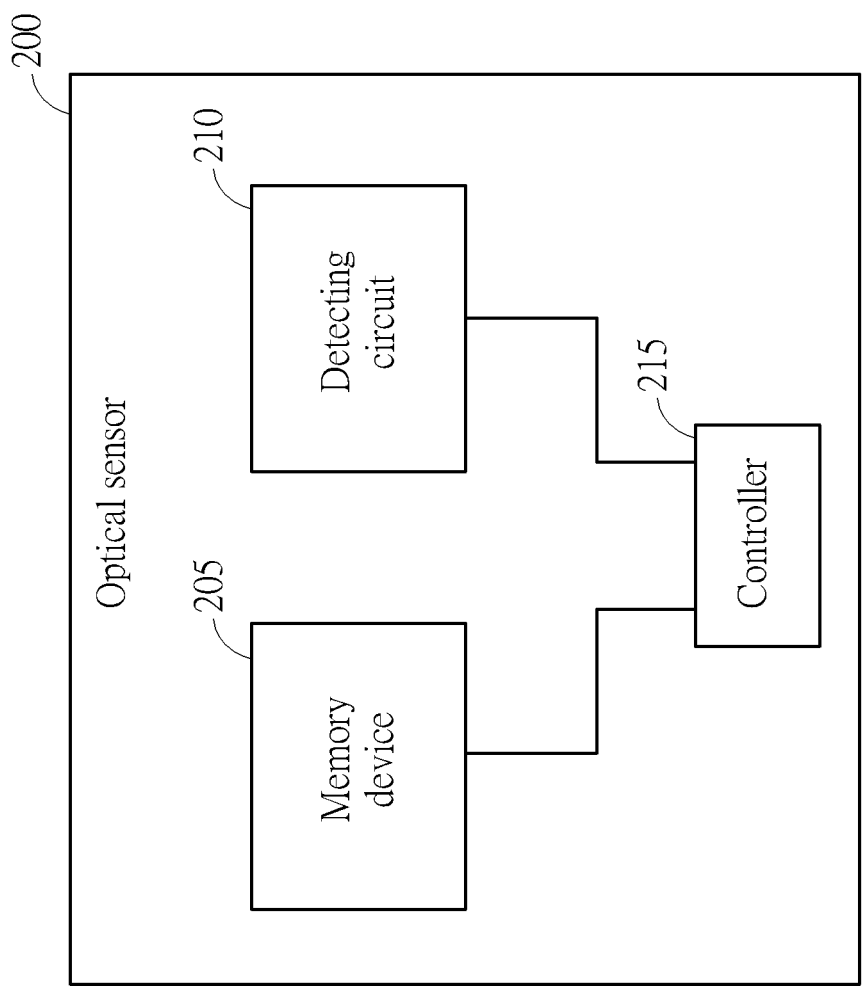
FIG. 2 is a block diagram of an optical sensor capable of calibrating a value of sampling precision of the optical sensor according to the method of FIG. 1.

In one embodiment, the above-mentioned memory device is located within the optical sensor, and the method and corresponding steps can be performed by the optical sensor. FIG. 2 is a block diagram of an optical sensor 200 capable of calibrating a value of sampling precision of the optical sensor 200. The optical sensor 200 comprises a memory device 205, a detecting circuit 210, and a controller 215. The memory device 205 is arranged for storing the precision variance V and the setting precision value SR. The detecting circuit 210 is arranged for measuring the sampling precision of the optical sensor 200 under the normal mode to generate the actually measured precision value AR. The controller 215 is coupled to the memory device 205 and the detecting circuit 210 and is arranged for calculating the normalized value NR that is proportional to the actually measured precision value AR according to the precision variance V, the actually measured precision value AR, and the setting precision value SR, and for calibrating the actually measured precision value AR by using the normalized value NR. In addition, the detecting circuit 210 and controller 21 can operate to obtain the precision variance V under the test mode, and the operation is not detailed for brevity.

Figure 3:
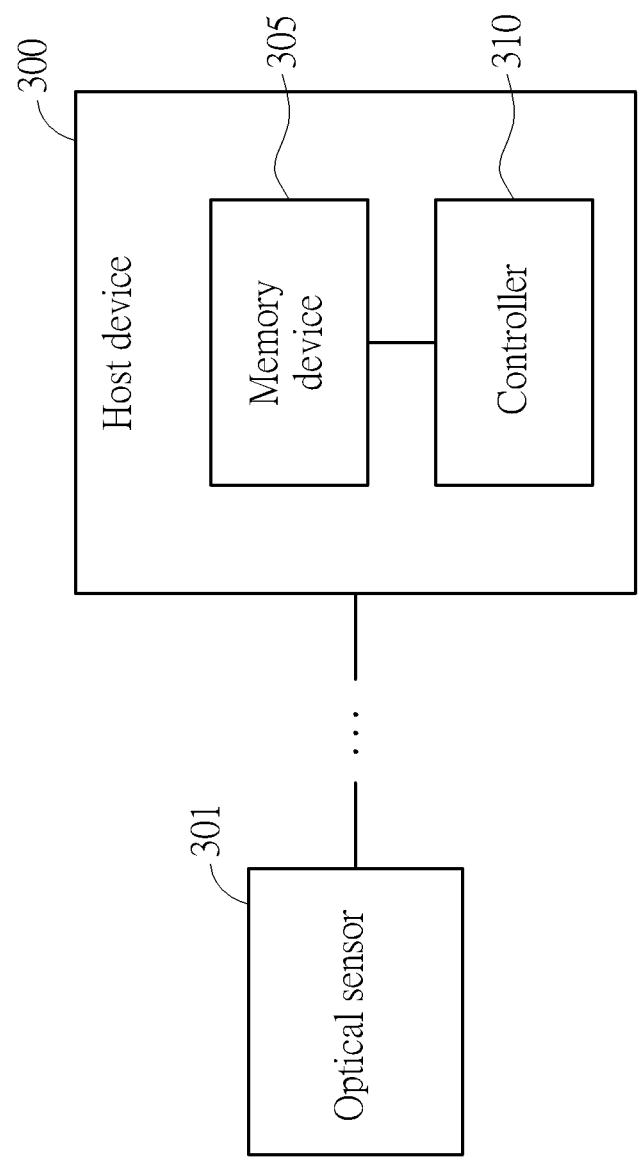
FIG. 3 is a block diagram of a host device remotely connected to an optical sensor and capable of calibrating a value of sampling precision of the optical sensor according to the method of FIG. 1.

Additionally, in another embodiment, the optical sensor is coupled to a remote host device in which the memory device is located, and the method and corresponding steps can be performed by the remote host device. FIG. 3 is a block diagram of a host device 300 remotely connected to an optical sensor 301 and capable of calibrating a value of sampling precision of the optical sensor 301. The host device 300 comprises a memory device a memory device 305 and a controller 310. The memory device 305 is arranged for storing the precision variance V and the setting precision value SR. The controller 310 is coupled to the memory device 305 and arranged for controlling the optical sensor 301 to measure the sampling precision of the optical sensor 301 under the normal mode to generate the actually measured precision value AR, for calculating the normalized value NR that is proportional to the actually measured precision value AR according to the precision variance V, the actually measured precision value AR, and the setting precision value SR, and for calibrating the actually measured precision value AR by using the normalized value NR. In addition, the controller 310 can operate to obtain the precision variance V under the test mode, and the operation is not detailed for brevity.

Further, it should be noted that the method and corresponding steps can be triggered and performed each time when the optical sensor starts up or can be trigger by the optical sensor or the host device. In addition, the optical sensor can be used for tracking movement of a printer head, movement of an optical mouse, and/or movement of a lase mouse; this is not intended to be a limitation of the invention.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A method for calibrating a value of sampling precision of an optical sensor for tracking a mouse device, comprising:

reading a precision variance and a setting precision value from a memory device;

measuring the sampling precision of the optical sensor under a normal mode to generate an actually measured precision value;

calculating a normalized value according to the precision variance, the actually measured precision value, and the setting precision value, wherein the normalized value is proportional to the actually measured precision value and is inversely proportional to the precision variance; and reporting and sending the normalized value as a result of a motion of the mouse device to a remote host device to make the remote host device control the mouse device based on the normalized value.

2. The method of claim 1, further comprising:
obtaining the setting precision value;
measuring the sampling precision of the optical sensor under a test mode to generate a test precision value;
calculating a difference between the setting precision value and the test precision value, to obtain the precision variance; and
storing the precision variance and the setting precision value in the memory device.

3. The method of claim 1, wherein the memory device is located within the optical sensor, and the method is performed by the optical sensor.

4. The method of claim 1, wherein the optical sensor is coupled to the remote host device in which the memory device is located, and the method is performed by the remote host device.

5. The method of claim 1, wherein the optical sensor is used for tracking movement of an optical mouse or movement of a laser mouse.

6. The method of claim 1, being performed each time when the optical sensor starts up.

7. The method of claim 1, wherein the normalized value is generated based on an equation:

$$NR = AR \times \frac{1}{SR + V} \times SR$$

wherein NR is the normalized value, AR is the actually measured precision value,
SR is the setting precision value, and V is the precision variance.

8. An optical sensor capable of calibrating a value of sampling precision of the optical sensor for tracking a mouse device, comprising:

a memory device storing a precision variance and a setting precision value;

a detecting circuit, for measuring the sampling precision of the optical sensor under a normal mode to generate an actually measured precision value; and a controller, coupled to the memory device and the detecting circuit, for calculating a normalized value according to the precision variance, the actually measured precision value, and the setting precision value, and for reporting and sending the normalized value as a result of a motion of the mouse device to a remote host device to make the remote host device control the mouse device based on the normalized value;

wherein the normalized value is proportional to the actually measured precision value and is inversely proportional to the precision variance.

9. The optical sensor of claim 8, wherein the detecting circuit is arranged to measure the sampling precision of the optical sensor under a test mode to generate a test precision value; the controller is arranged to calculate a difference between the setting precision value and the test precision value, to obtain the precision variance; and, the controller stores the precision variance and the setting precision value into the memory device.

10. The optical sensor of claim 8 is used for tracking movement of an optical mouse or movement of a laser mouse.

11. The optical sensor of claim 8, wherein the controller is arranged to calibrate the actually measured precision value each time when the optical sensor starts up.

12. The optical sensor of claim 8, wherein the normalized value is generated based on an equation:

$$NR = AR \times \frac{1}{SR + V} \times SR$$

wherein NR is the normalized value, AR is the actually measured precision value,
SR is the setting precision value, and V is the precision variance.

13. A host device remotely connected to an optical sensor and capable of calibrating a value of sampling precision of the optical sensor for tracking a mouse device, comprising:

a memory device storing a precision variance and a setting precision value;

a controller, coupled to the memory device, for controlling the optical sensor to measure the sampling precision of the optical sensor under a normal mode to generate an actually measured precision value, for calculating a normalized value according to the precision variance, the actually measured precision value, and the setting precision value, and for receiving the normalized value reported and sent from the optical sensor and for controlling the mouse device based on the normalized value; wherein the normalized value is proportional to the actually measured precision value and is inversely proportional to the precision variance.

14. The host device of claim 13, wherein the controller is arranged to control the optical sensor to measure the sampling precision of the optical sensor under a test mode to generate a test precision value; and, the controller is arranged to calculate a difference between the setting precision value and the test precision value, to obtain the precision variance, and to store the precision variance and the setting precision value into the memory device.

15. The host device of claim 13, wherein the optical sensor is used for tracking movement of an optical mouse or movement of a laser mouse.

16. The host device of claim 13, wherein the controller is arranged to calibrate the actually measured precision value each time when the optical sensor starts up.

17. The host device of claim 13, wherein the normalized value is generated based on an equation:

$$NR = AR \times \frac{1}{SR + V} \times SR$$

wherein NR is the normalized value, AR is the actually measured precision value,
SR is the setting precision value, and V is the precision variance.

* * * * *